United States Patent

[11] 3,549,964

[72] Inventors Igor Anatolievich Levin;
Anatoly Yakolevich Levin, both of Ulitsa Stepana Supruna, 12, kv. 74; Nikolai Evstigneevich Fedorov, Volokolamskoe shosse, 6, kv. 213; Iosif Alexandrovich Rogov, Ulitsa Vostrukhina, 7, kv. 80; and Erik Eduardovich Afanasov, Ulitsa Baumanskaya, 26, kv. 4., all of Moscow, U.S.S.R.
[21] Appl. No. 709,688
[22] Filed Mar. 1, 1968

[54] DEVICE FOR DEICING SURFACES OF THIN-WALLED STRUCTURES
12 Claims, 3 Drawing Figs.
[52] U.S. Cl..................................................... 317/262, 244/134
[51] Int. Cl..................................................... B64d 15/00
[50] Field of Search.......................................... 244/134A, 134D; 317/262

[56] References Cited
UNITED STATES PATENTS
2,297,951  10/1942  Frank........................... 244/134A

*Primary Examiner*—J D Miller
*Assistant Examiner*—William J. Smith
*Attorney*—Waters, Roditi, Schwartz & Nissen ABSTRACT: A pulse generator is installed close to walls of a thin-walled structure such as a sheathing of aircraft and ships to impart pulses to the walls and subject the walls to elastic deformations to cause any ice formed on the walls to be broken up and removed from the walls. The pulse generator may produce electromagnetic field pulses or it may produce pressure pulses in a working medium confined in a chamber proximate the walls to be deiced.

DEVICE FOR DEICING SURFACES OF THIN-WALLED STRUCTURES

This invention relates to devices for deicing the surfaces of thin-walled structures under the conditions of ice formation.

Primarily this invention relates to devices for deicing the surfaces of sheet metal sheathings of aircraft and ships. However, this does not limit the employment of the device according to this invention which can be effectively used in other transport devices or in other apparatus and structures as well.

Moreover, the device according to this invention can be successfully used in tubular aerials.

Known in the art are devices for deicing the surfaces of an aircraft, said devices comprising rubber deicer boots installed on the surface of the thin-walled structure subject to icing, for example, on the sheathing of an aircraft, said deicer boots communicating with a source of compressed air ("Goodrich" deicer).

Upon icing of the aircraft in flight, compressed air is supplied into the deicer boots which expand accordingly, thus breaking up the ice which is subsequently removed by the airstream.

However, the employment of the deicer of the type mentioned above involves certain difficulties. Since the flight speed of the aircraft is relatively high, and the deicer boot materially increases the aerodynamic resistance, especially in the inflated state.

The material of the boot is subject to ageing resulting in deterioration of its elasticity. The ice fails to be completely removed from the surface of the boot owing to strong adhesion to the material of the deicer boot. Additionally, difficulties of a design nature arise in connection with condensate removal from the air system, and with the necessity of ensuring adequate airtightness of this system.

The majority of high-speed aircraft are equipped with devices for deicing the surface of the craft sheathing based on the effect of heating of the surfaces subject to icing by means of electricity or hot air. However, when said deicing devices are in operation, they require much of the engine power to be able to melt the ice formed on the protective surface of the aircraft sheathing. The time necessary for heating the surface of the aircraft and melting the ice formed thereon is comparatively long (of the order of several dozens of seconds). In case of successive heating of separate sections of the heated zone, as is done in cyclic heating systems, the total time of the heating cycle and the interval amounts to several minutes.

Since the heating zones do not cover the entire surface of the aircraft, water is formed which is blown off by the airstream beyond the heated zone and freezes therein in the form of so-called "barrier ice" which adversely affects the aerodynamic characteristics of the aircraft.

Heavy weight and large overall dimensions of the hot air deicer and its piping system also adversely affect the economic and performance characteristics of the aircraft.

The main object of this invention is to eliminate these disadvantages and to provide a deicing device requiring a comparatively low power to be continuously consumed from the source of power.

Another object of the invention is to provide a deicing device possessing a high speed operation, i.e., ensuring deicing within several seconds.

A still further object of the invention is to provide a deicing device which does not involve the formation of "barrier ice," from the water freezing beyond the protected zone.

Another object of the invention is to provide a deicing device which does not adversely affect the aerodynamic characteristics of the aircraft.

A still further object of the invention is to provide a deicing device whose operation does not require the installation of additional elements on the surface of the sheathing, said device possessing light weight and being of a compact size.

Still another object of the invention is to provide a deicing device possessing a high operating efficiency and enabling the aircraft to be flown under the heaviest icing conditions at low temperatures of ambient air.

Yet another object of the invention is to provide a deicing device which is more economical in the obtaining of the specified effect under the given icing conditions and at given ambient air temperatures than existing deicers.

The above-mentioned and other objects of the invention are achieved by the provision of a device for deicing the surfaces of thin-walled structures, primarily the surfaces of sheet metal sheathing of aircraft and ships, in which, according to the invention, means for generating electromagnetic field pulses or pressure pulses in a working medium are installed close to the walls to be deiced, said pulses being imparted to the walls i.e. (to the sheet-metal sheathing) to subject said walls to the effect of a force causing elastic deformation of said walls in the zone being deiced.

The means for generating electromagnetic field pulses preferably has the form of wire coils positioned close to the walls and connected to at least one source of electric pulses.

The means for generating pressure pulses in the working medium preferably has the form of at least one chamber positioned close to the walls and filled with the working medium which is a nonelectroconductive fluid, said chamber accommodating electrodes connected to at least one source of electric pulses, while at least one of the chamber walls if formed by the sheet metal wall to be deiced.

The means for generating the pulses imparted to the walls is preferably of a type ensuring a pulse duration of not more than 0.1 sec., the interval between successive pulses being at least ten times greater than the duration of the pulse proper.

The means for generating the pulses is connected to the source of electric pulses preferably in turn connected to an electric power storage means.

It is also preferable to place several pulse-generating means close to the walls to be deiced, said pulse-generating means being connected to the source of electric pulses and producing successive generation of pulses.

In certain cases simultaneous generation of pulses is preferable.

Specific features and advantages of this invention will appear more completely from the following description of several embodiments thereof which are given by way of example with reference to the accompanying drawings in which.

Figure 1:
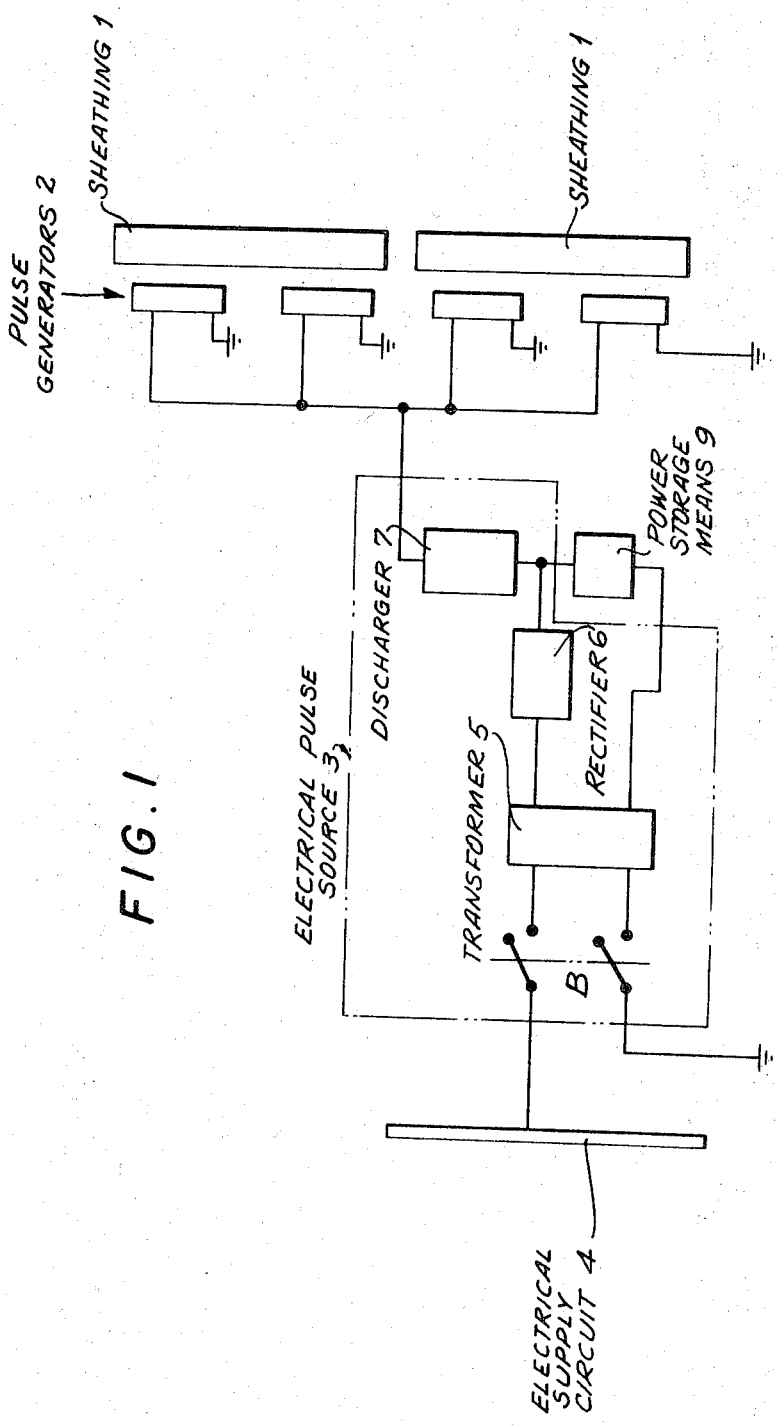
FIG. 1 is a diagrammatic illustration of a device for deicing the surfaces of thin-walled structures, according to the invention.

Close to a sheet metal sheathing 1 (FIG. 1) there are installed means 2 for generating electromagnetic field pulses.

The above-mentioned electromagnetic field pulses interact with the metal elements of the sheathing, or with said sheathing as a whole, if the latter is made from metal sheets.

As a result, the sheathing is subjected to the effect of force which causes elastic deformation of the sheathing in the zone being deiced. To eliminate the possibility of local damage, said force is applied without imparting mechanical impact forces to the sheathing.

The means 2 for generating electromagnetic field pulses are connected to a source 3 of electric pulses, said source being connected to an electric supply circuit 4 of the aircraft.

The source 3 of electric pulses comprises a transformer 5 connected through a rectifier 6 to a discharger 7 producing electric pulses. A switch 5 is connected between supply circuit 4 and transformer 5.

Between the rectifier 6 and discharger 7 there is connected a power storage means 9 having the form of a capacitor intended to reduce power consumption from the electric circuit.

The discharger 7 is connected to the means 2 which generate electromagnetic field pulses.

In order to increase the area of the deiced zones of the sheathing 1, a number of pulse-generating means 2 are installed close to said sheathing, said means operating simultaneously. In this case the power consumption increases somewhat.

A similar effect can be achieved without increasing power consumption from the electric circuit, by connecting said means 2 to the source of electric pulses in series, the pulses in this case being generated by the means 2 on the "runaround" principle.

Figure 2:
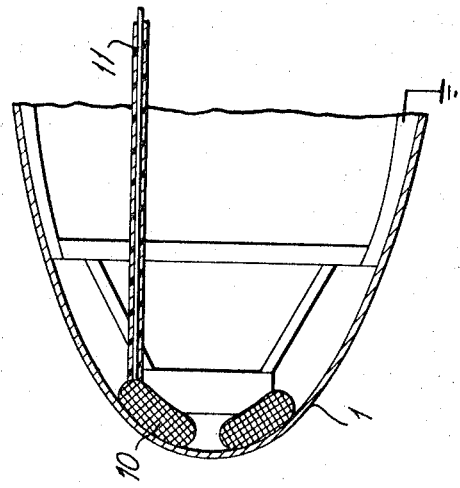
FIG. 2 is an elevation view partly in section of means for generating electromagnetic field pulses.

FIG. 2 shows a means for generating electromagnetic field pulses in the form of wire coils 10. The coils 10 are connected by means of a conductor 11 to the source 3 of the electric pulses.

The wire coils 10 may be fashioned into a solenoid.

In order to reduce magnetic field losses between the solenoid and the sheathing, the gap between them should be as small as practicable from the point of view of manufacture, while the shape of the solenoid should follow the outlines of the sheathing, or closely resemble them.

According to another embodiment of this invention, the means for generating the pressure pulses in a working medium are installed close to the sheet metal sheathing 1 (FIG. 1), said pressure pulses interacting with the sheathing. As a result, a force is applied to the sheathing, said force causing elastic deformations of the sheathing in the zone being deiced.

Figure 3:
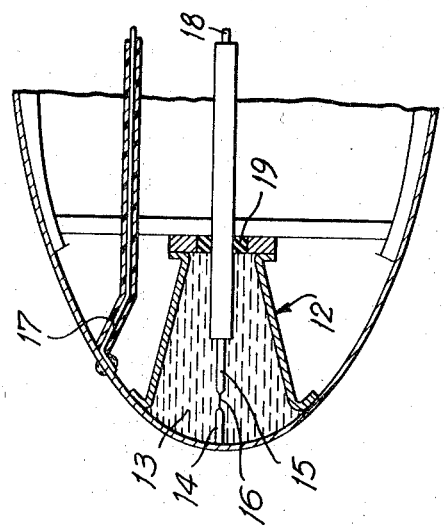
FIG. 3 is an elevation view partly in section of means for generating pressure pulses in a working medium.

The means 2 for generating the pressure pulses in the working medium comprises a chamber 12 (FIG. 3) filled with a nonelectroconductive fluid 13, said chamber accommodating electrodes 14 and 15 with a spark gap 16 therebetween, while at least one wall of said chamber is formed by the wall of the sheathing 1 being deiced. The electrodes 14 and 15 are connected by means of conductors 17 and 18 to the electric pulse source 3 which may comprise a power storage means.

When a single-wire electric circuit is used, the conductor 17 is grounded to the sheathing of the aircraft or ship.

The electrode 15 is fitted into the chamber through an insulator 19.

The working fluid 13 should be of the type which will not flame in the case of spark jumping of the gap.

The fluid 13 can act upon the sheathing 1 through intermediate flexible diaphragms or through the walls of the flexible casing which may accommodate said fluid.

The fluid-filled chamber 12 can be formed by the sheathing 1 being deiced if said sheathing has a tubular shape, for example, when deicing the surfaces of tubular aerials.

A number of chambers can be installed close to the sheathing being deiced. Said chambers can impart pressure pulses to the sheathing in turn or simultaneously, similarly to the device according to the first embodiment of the invention, as described above.

The means 2 for generating the pressure pulses in the working medium need not be actuated by electric power as described with reference to the embodiment mentioned above, but can be powered from a source of air or hydraulic pressure.

The means for generating the pulses imparted to the walls are of the type ensuring pulse shaping according to a particular function for securing the maximum effect in each given case. In order to reduce power consumption the duration of the pulse should be as short as possible, not more than one-fourth of the period of vibration of the structure itself, and in any case not more than 0.1 sec. To ensure a higher effect of the obtained pulse, said pulse should possess a steep front the rate of pulse rise being higher than the speed of ice relaxation, but lower than the "critical impact rate" allowed for the particular material of the sheathing, to prevent damage of the latter.

The pulse amplitude should be such that the ice comes off the sheathing throughout the zone being deiced, the stresses caused in the sheathing and the structure not exceeding the limit of cyclic fatigue. Allowance should also be made for all the other stresses acting concurrently and caused by various operational loads upon the sheathing and the structure.

The pulse repetition rate should not be shorter than the rate of vibration of the structure itself. Therefore, on termination of the pulse there should be interval longer than the pulse itself. In order to reduce the mean value of the power consumed from the source of electric supply, the duration of the interpulse pause (i.e. the interval between successive pulses) should be as long as possible.

The device according to this invention will be reasonably economical if the pulse repetition rate is such that the interpulse pause is at least ten times greater than the duration of the pulse proper.

In addition to the above, the device according to this invention can comprise control, distribution, commutation and signal elements widely employed in the respective field of engineering.

When necessary, the elements and wires used in the device according to this invention can be completely or partly screened in order to reduce their influence upon other electric systems installed in the aircraft or ship.

The device for deicing surfaces of thin-walled structures according to this invention functions as follows.

When the aircraft or ship enters an icing zone, or when a stationary structure is subjected to icing, the source 3 for generating electric pulses is started and transmits electric pulses shaped in accordance with a particular function to the means 2 which generate electromagnetic field pulses, or to the means 2 for generating pressure pulses in the working medium.

When an electric pulse is sent to the means 2 which generates electromagnetic field pulses (said means 2 being fashioned as a solenoid 10 installed close to the sheathing) owing to the alternating increases and decreases of current, an alternating electromagnetic field is produced which induces alternating electric current in the material of the sheathing 1. The interaction of primary and induced current causes movement of the sheathing 1 in relation to the fixed solenoid. However, the electric pulse sent to the solenoid has a short duration, therefore the increase and decrease of the current takes place within a short time and with a very steep front, consequently, the movement of the sheathing occurs also within a short period of time and with a high speed.

Owing to the elastic properties of the sheathing, its deformation spreads from the place of origination opposite the solenoid all over the sheathing zone being deiced with the aid of the given solenoid (an elastic deformation wave is formed, which propagates throughout the sheathing).

The above-mentioned elastic deformation wave breaks up the ice and throws it off the surface of the sheathing or other structure.

If the process described herein takes place in flight, the ice separated from the sheathing is blown off by the airstream.

When an electric pulse is sent to the means 2 which generates pressure pulses, (said means 2 being made as the chamber 12 placed close to the sheathing and filled with nonelectroconductive fluid 13, and electrodes 14 and 15 installed in said chamber), an electric spark jumps the spark gap 16, thus generating a pressure pulse of the working medium, said pulse being imparted to the sheathing. Due to the elastic properties of the sheathing, its deformation spreads from the place of its origination all over the sheathing zone being deiced (an elastic deformation wave is formed, which propagates throughout the sheathing). This elastic deformation wave removes the ice from the surface of the sheathing or other structure.

In describing the present embodiment of the invention, terms in their narrow sense have been used for the sake of lucidity. However, the invention is not limited to the narrow sense of the terms used and it will be understood that each of said terms embraces all the equivalent elements functioning in a similar way and employed for the same purposes.

Though this invention has been described herein with reference to the preferable type of its embodiment it will be understood that there may be different modifications and variations thereof, without departure from the spirit and scope of said invention, as those skilled in the art will easily understand.

All these modifications and variations are considered to remain within the limits of the spirit and scope of this invention if defined by the appended claims.

We claim:

1. A device for deicing thin-walled structures, primarily the sheet metal sheathing of aircraft and ships, said device comprising means for generating electromagnetic field pulses and means mounting the latter means close to the walls being deiced such that said pulses are imparted to the walls and subject said walls to the effect of force which causes elastic deformations of the walls in the zone being deiced.

2. A device for deicing thin-walled structures, primarily the sheet metal sheathing of aircraft and ships, said device comprising means for generating pressure pulses in a working medium in an elastic enclosure, and means installing the elastic enclosure close to the walls being deiced such that said pulses in the medium are imparted to the walls and subject said walls to the effect of force which causes elastic deformations of the walls in the zone being deiced.

3. A device for deicing thin-walled structures, primarily the sheet metal sheathing of aircraft and ships, said device comprising means for generating electromagnetic field pulses and means mounting the latter means close to the walls being deiced such that said pulses are imparted to the walls and subject said walls to the effect of force which causes elastic deformations of the walls in the zone being deiced, said pulse-generating means comprising wire coils, and at least one source of electric pulses connected to said coils.

4. A device for deicing thin-walled structures, primarily the sheet metal sheathing of aircraft and ships, said device comprising means for generating pressure pulses in a working medium, means mounting the first said means close to the walls being deiced such that said pulses are imparted to the walls and subject said walls to the effect of force which causes elastic deformations of the walls in the zone being deiced, said means for generating pressure pulse comprising at least one chamber filled with said working medium which is a nonelectroconductive fluid, electrodes in said chamber and at least one source of electric pulses connected to said electrodes, at least one of the walls of said chamber being formed by the wall to be deiced.

5. A device for deicing thin-walled structures, primarily the sheet metal sheathing of aircraft and ships, said device comprising means for generating electromagnetic field pulses and means mounting the first said means close to the walls being deiced such that said pulses are imparted to the walls and subject said walls to the effect of force which causes elastic deformations of the walls in the zone being deiced, said means for generating pulses having a pulse duration of not more than 0.1 sec., the interval between successive pulses exceeding the duration of the pulse proper by at least ten times.

6. A device for deicing thin-walled structures, primarily the sheet metal sheathing of aircraft and ships, said device comprising means for generating pressure pulses in a working medium, means mounting the first said means close to the walls being deiced such that said pulses in said medium are imparted to the walls and subject said walls to the effect of force which causes elastic deformations of the walls in the zone being deiced, said means for generating pulses having a pulse duration of not more than 0.1 sec., the interval between successive pulses exceeding the duration of the pulse proper by at least ten times.

7. A device as claimed in claim 1, in which the means for generating electromagnetic field pulses imparted to the walls is connected to a source of electric pulses which in turn is connected to an electric power storage means.

8. A device as claimed in claim 2, in which the means for generating pressure pulses in the working medium is connected to a source of electric pulses which in turn is connected to an electric power storage means.

9. A device as claimed in claim 1, in which close to the wall zones being deiced there are installed a plurality of said means for generating electromagnetic field pulses, the latter said means being connected to a source of electric pulses, and generating the pulses successively.

10. A device as claimed in claim 2, in which close to the wall zones being deiced there are installed a plurality of said means for generating pressure pulses in a working medium, the latter said means being connected to a source of electric pulses and effecting a successive generation of pulses.

11. A device as claimed in claim 5, in which close to the wall zones being deiced there are installed a plurality of said means for generating electromagnetic field pulses, the latter said means being connected to a source of electric pulses and effecting a successive generation of pulses.

12. A device as claimed in claim 6, in which close to the wall zones being deiced there are installed a plurality of said means for generating pressure pulses in a working medium, the latter said means being connected to a source of electric pulses to effect a successive generation of pulses.